July 28, 1959     H. R. NACK ET AL     2,896,570
APPARATUS FOR METALLIZING STRAND MATERIAL
Filed Aug. 16, 1954     13 Sheets-Sheet 1

INVENTORS
HERMAN R. NACK
JOHN R. WHITACRE
HOWARD J. HOMER
Toulmin & Toulmin
ATTORNEY July 28, 1959     H. R. NACK ET AL     2,896,570
APPARATUS FOR METALLIZING STRAND MATERIAL
Filed Aug. 16, 1954     13 Sheets-Sheet 2

INVENTORS
HERMAN R. NACK
JOHN R. WHITACRE
HOWARD J. HOMER
BY *Toulmin & Toulmin*
ATTORNEY

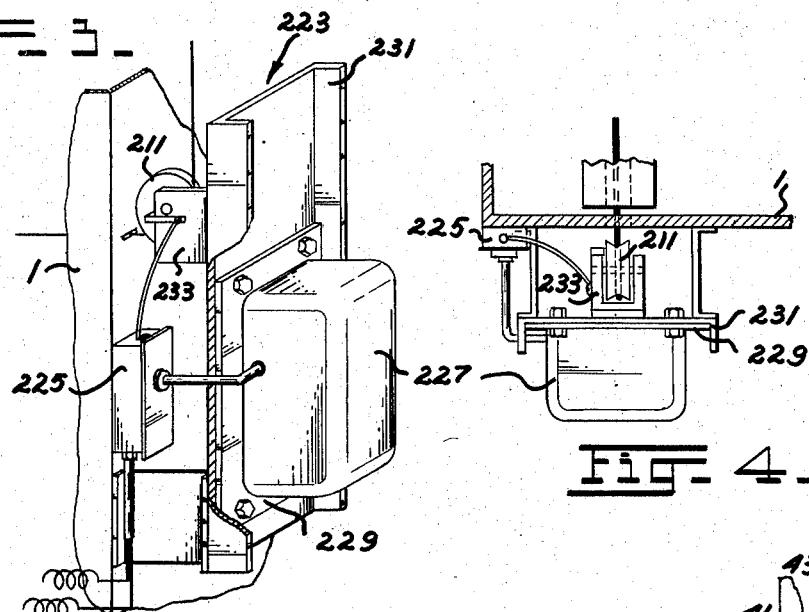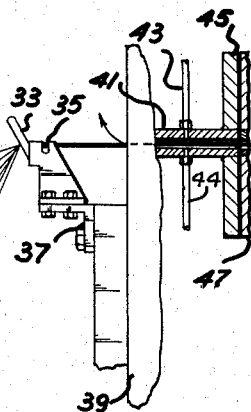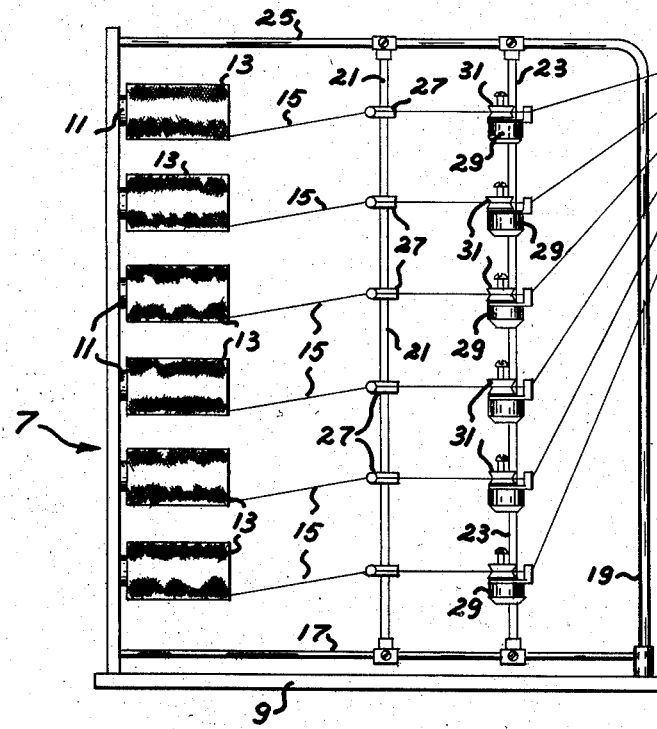

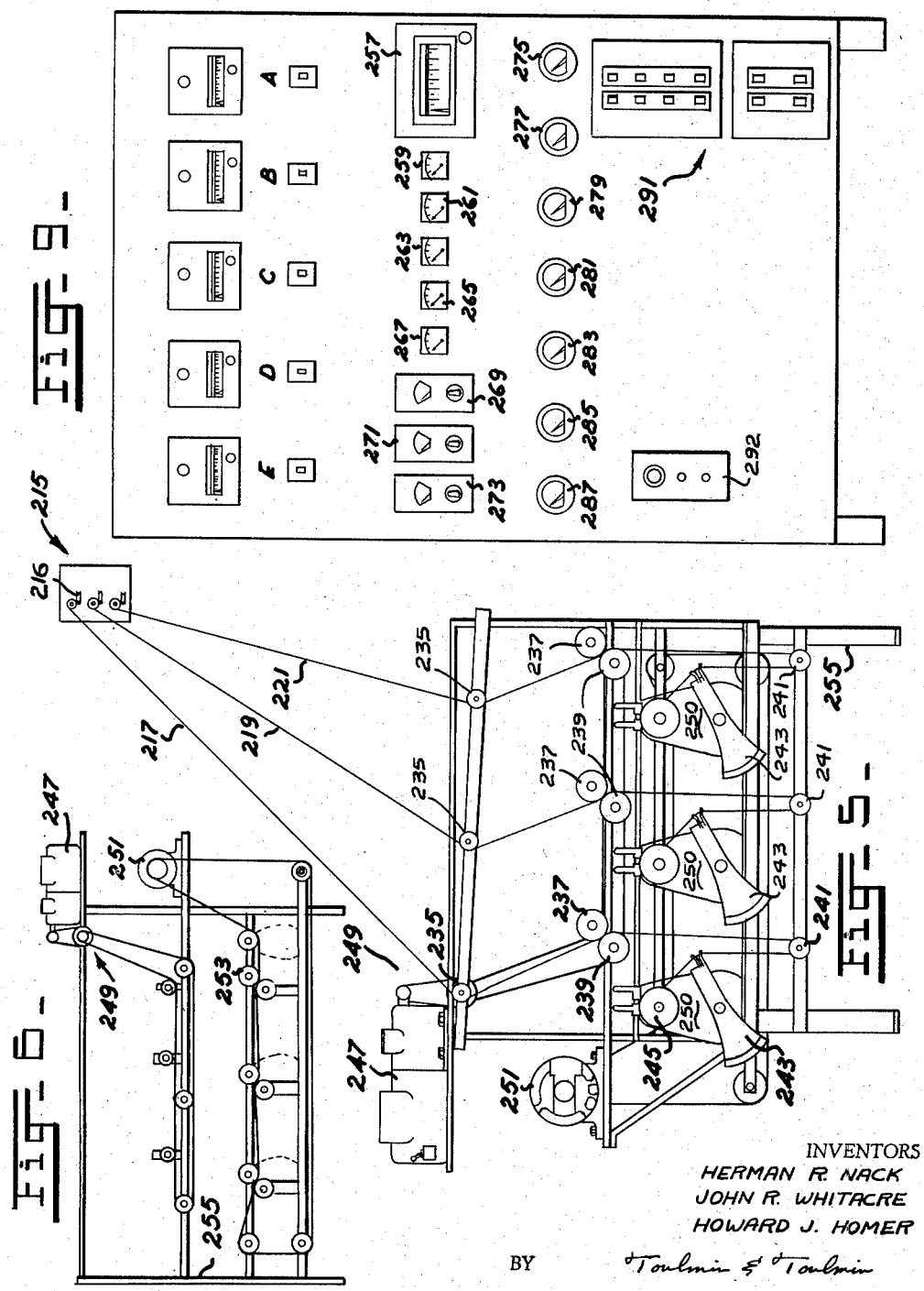

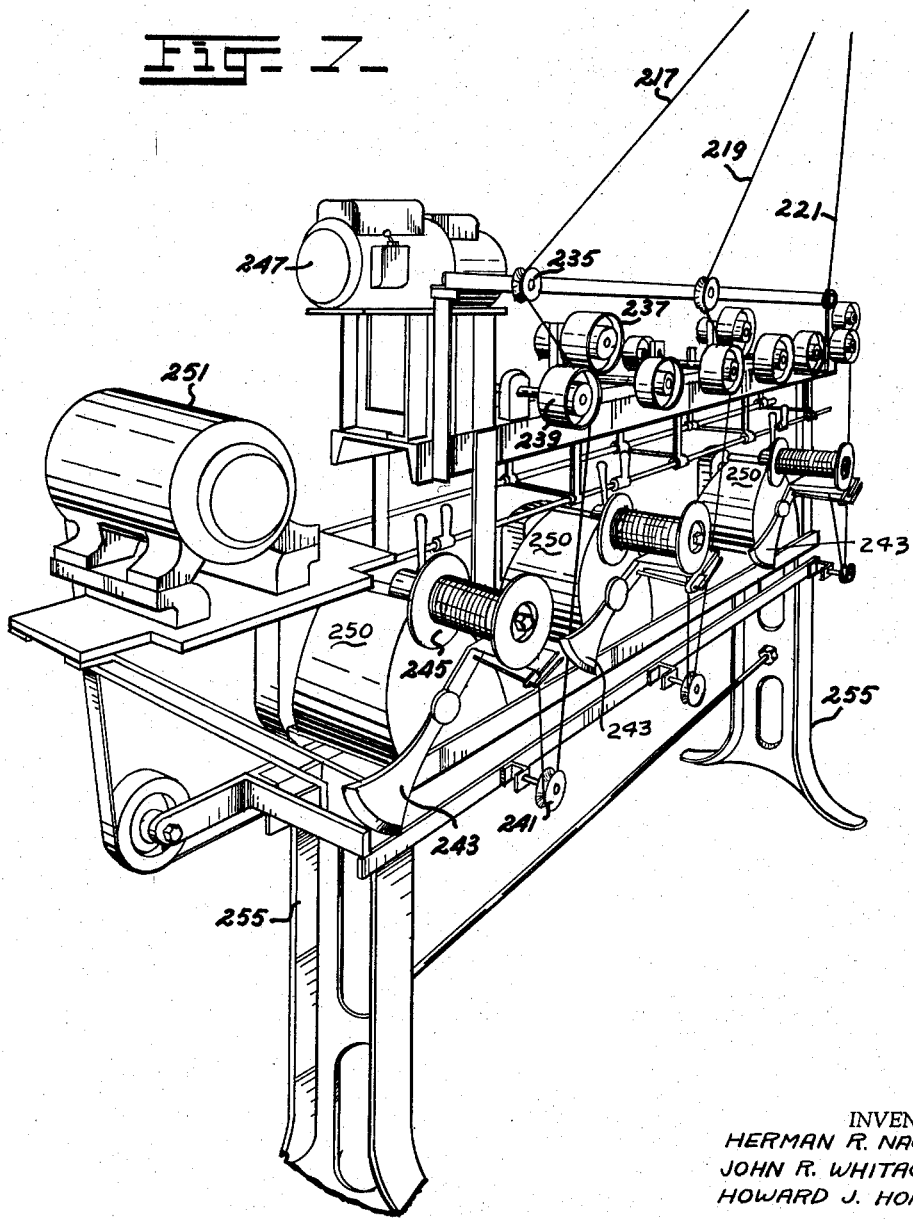

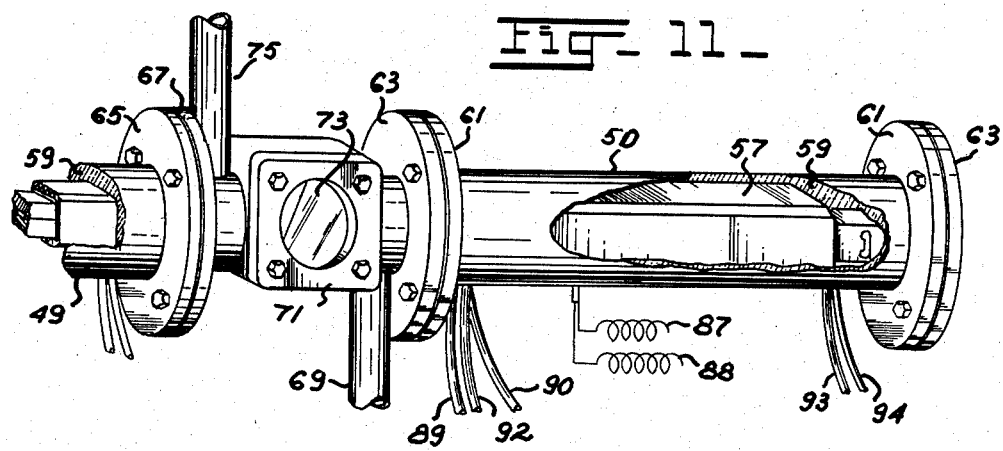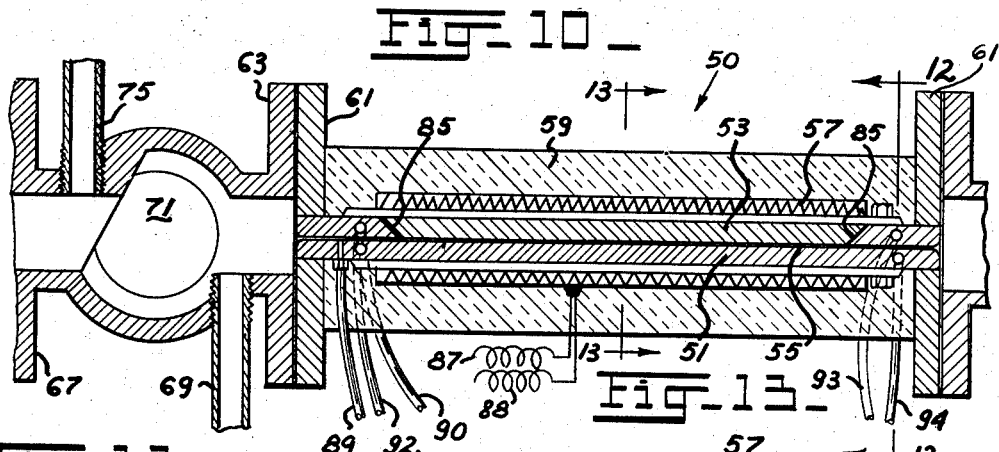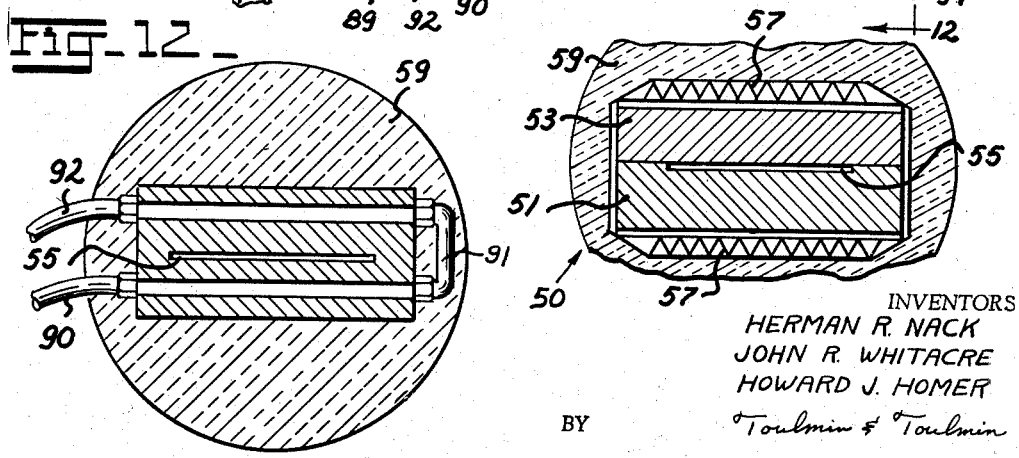

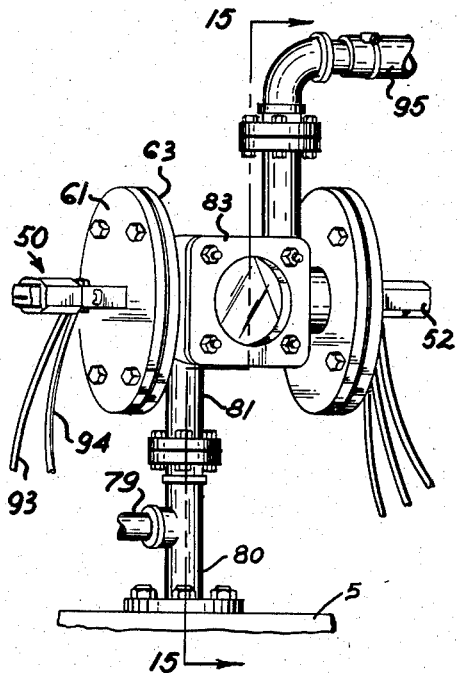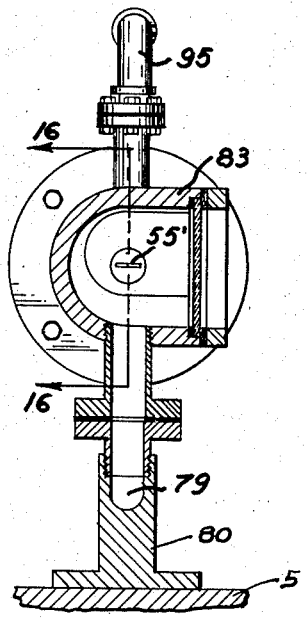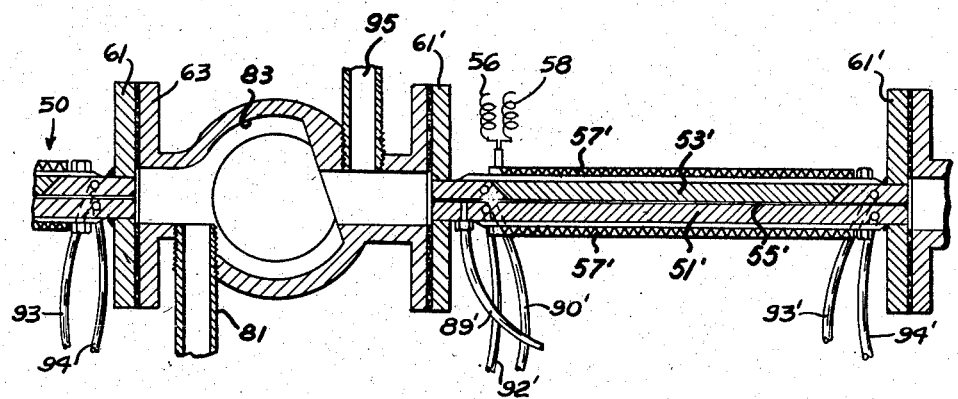

July 28, 1959 H. R. NACK ET AL 2,896,570
APPARATUS FOR METALLIZING STRAND MATERIAL
Filed Aug. 16, 1954 13 Sheets-Sheet 8
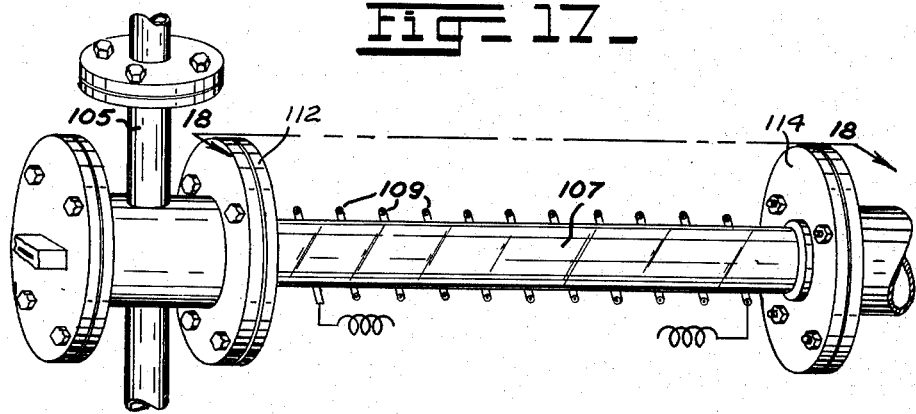
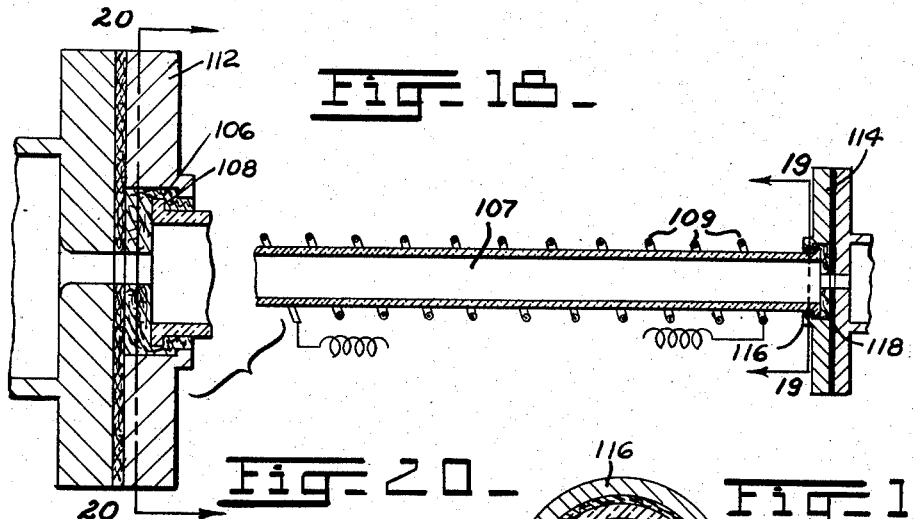
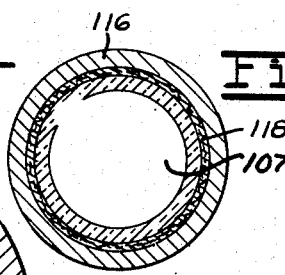
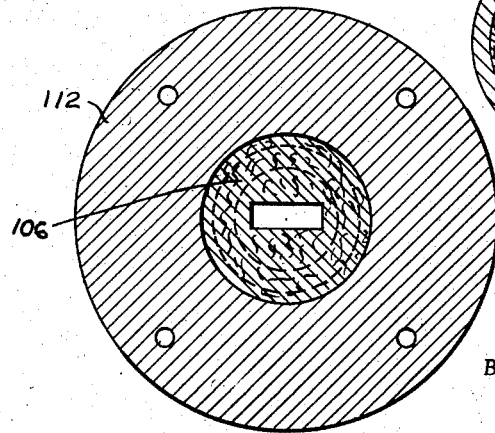
INVENTORS
HERMAN R. NACK
JOHN R. WHITACRE
HOWARD J. HOMER
BY Toulmin & Toulmin
ATTORNEY

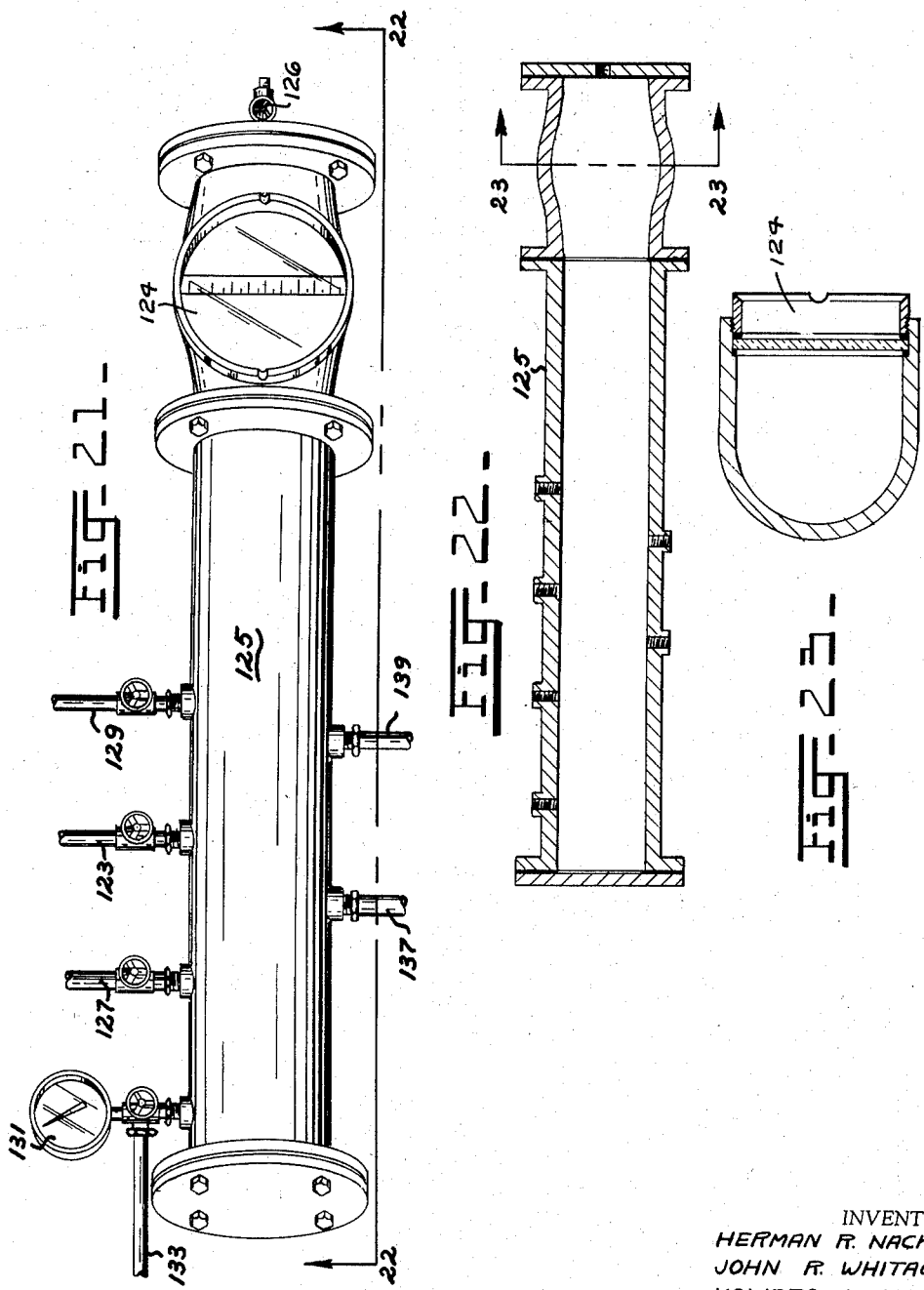

July 28, 1959 H. R. NACK ET AL 2,896,570
APPARATUS FOR METALLIZING STRAND MATERIAL
Filed Aug. 16, 1954 13 Sheets-Sheet 10
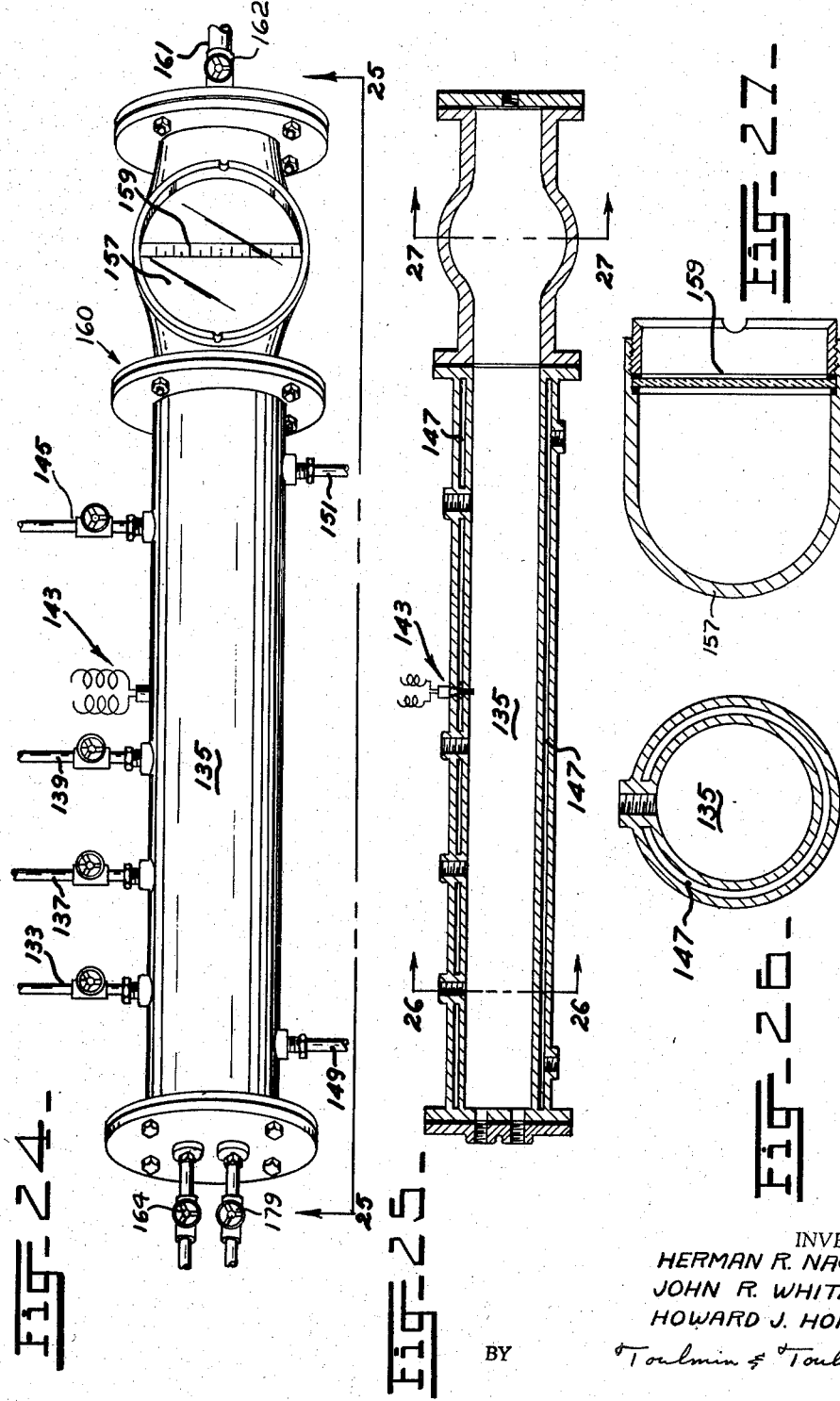
INVENTORS
HERMAN R. NACK
JOHN R. WHITACRE
HOWARD J. HOMER
BY Toulmin & Toulmin
ATTORNEY July 28, 1959   H. R. NACK ET AL   2,896,570
APPARATUS FOR METALLIZING STRAND MATERIAL
Filed Aug. 16, 1954   13 Sheets-Sheet 11
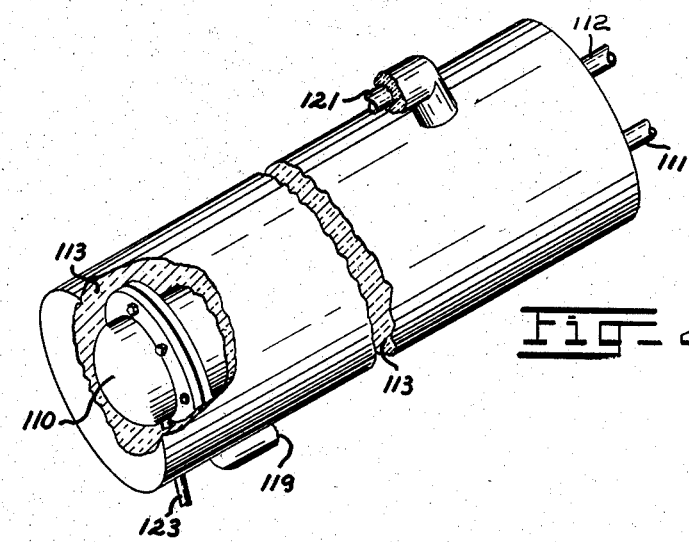
Fig-28-
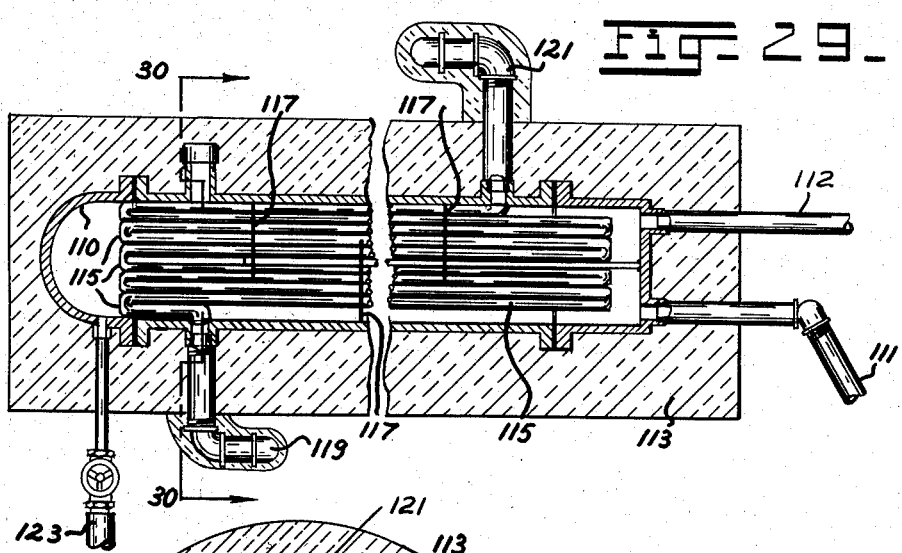
Fig-29-
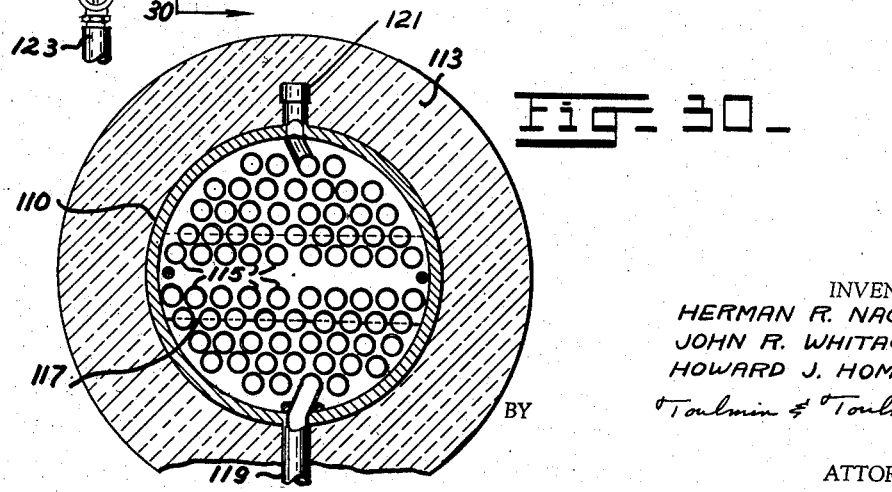
Fig-30-
INVENTORS
HERMAN R. NACK
JOHN R. WHITACRE
HOWARD J. HOMER
BY Toulmin & Toulmin
ATTORNEY

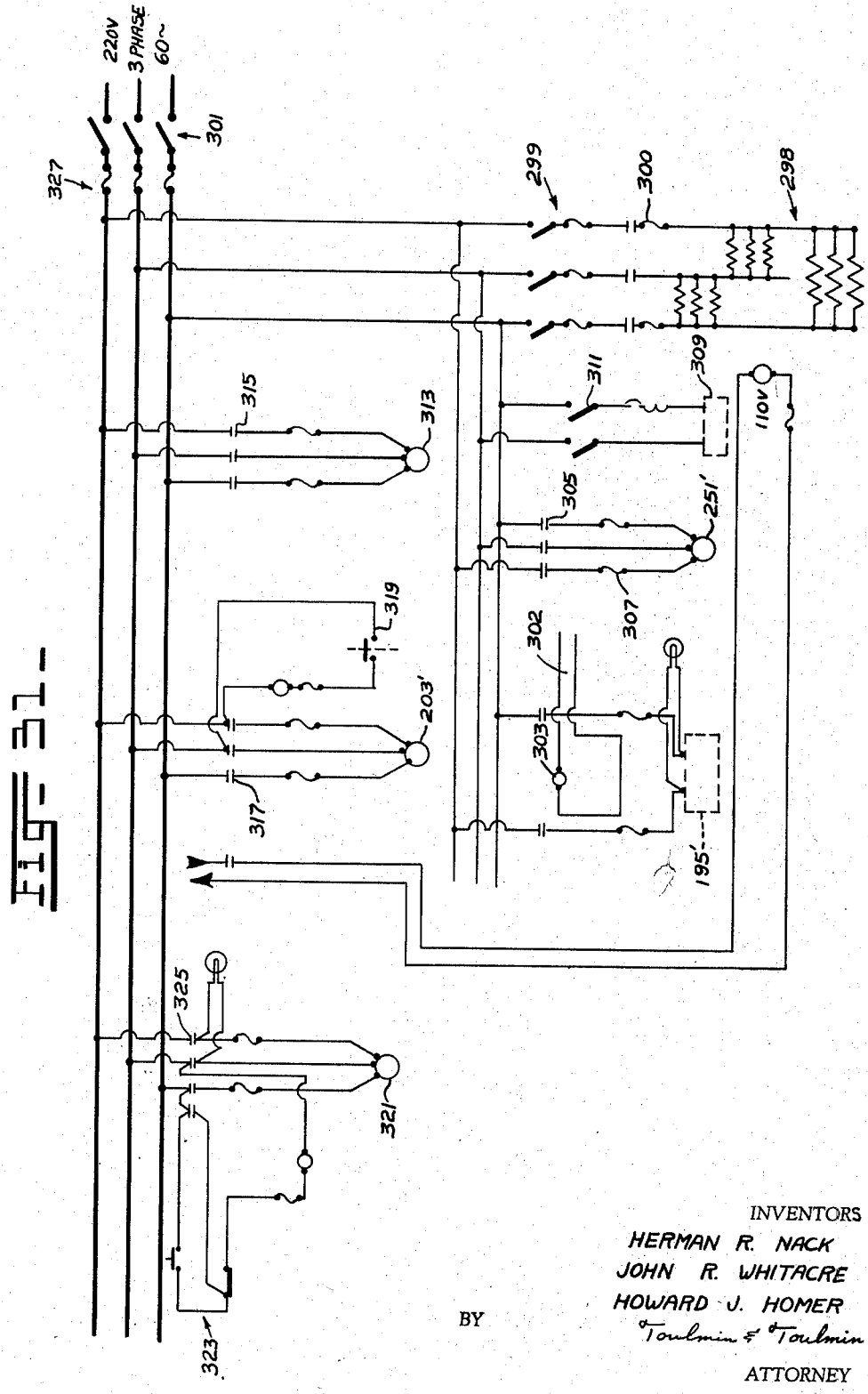

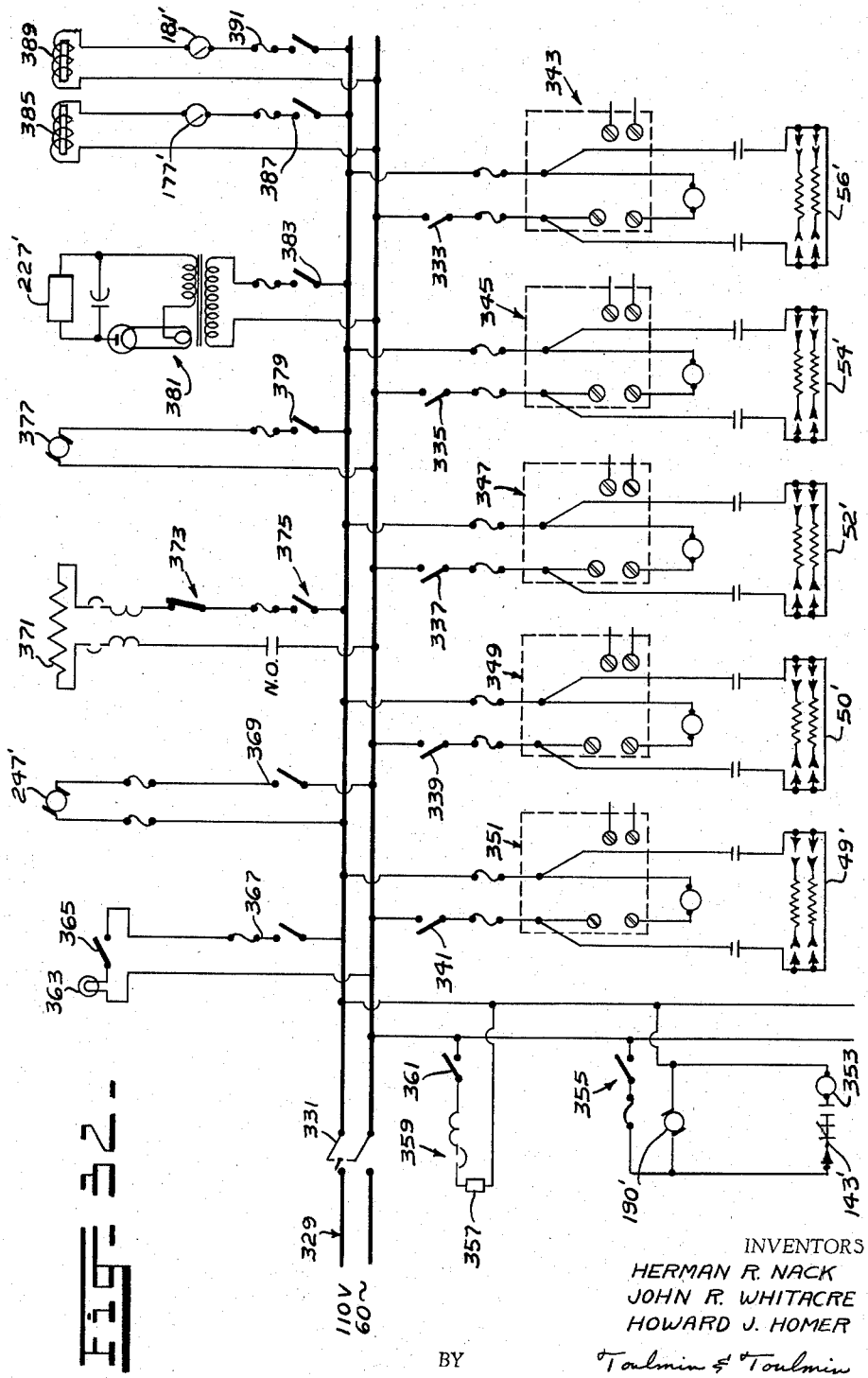

United States Patent Office 2,896,570
Patented July 28, 1959

2,896,570

APPARATUS FOR METALLIZING STRAND MATERIAL

Herman R. Nack, Columbus, and Howard J. Homer and John R. Whitacre, Dayton, Ohio, assignors to The Commonwealth Engineering Company of Ohio, Dayton, Ohio, a corporation of Ohio Application August 16, 1954, Serial No. 449,993

4 Claims. (Cl. 118—48)

This invention relates to the production of metallized materials at extremely high speeds and specifically relates to novel processes and equipment for the production of metallized fibrous materials It is a primary object of this invention to provide equipment for the metallizing of electrically non-conductive materials on a production basis, and to this end the equipment is provided with means for maintaining materials passing therethrough at temperatures sufficient to effect the deposition of metal on the material from a heat decomposable gaseous compound in contact with the same.

It is a principal object of the invention to provide equipment in which the material to be metallized is alternately heated and exposed to plating gases, it being a particular feature of the invention that the equipment is arranged to heat the material even after some deposition of metal has occurred thereon.

An important object of the invention is the provision of novel means for the heating of insulating material as it passes through the equipment.

A particular object of the invention is the provision of control means for accurately regulating variables in the process including the temperature of the material to be plated, the temperature pressure and quantity of flow of the heat decomposable metal bearing gas and similar factors.

It is also an object of the invention to provide novel means for segregating the heating means of the equipment from the chambers containing plating gases in order that unwanted decomposition of the heat decomposable compounds will not occur.

It is yet another object of the invention to provide novel processes for the effecting of the metallizing of heat softenable fibrous materials on a production basis.

Still another object of the invention is to provide on a production basis insulating materials normally having a substantially infinite resistance to the passage of current with a sufficient coating of metal to render the same highly electrically conductive without impairing the flexibility and other physical characteristics of these insulating materials.

An important object of the invention is the provision of production apparatus for the metallizing of fibrous materials which equipment is readily maintained at capacity production.

The apparatus of invention includes a train of heaters and plating chambers, a chamber being interposed after each heater, and in the method of invention the material undergoing metallization is most suitably passed through the train in sealed relation with the atmosphere, being exposed to heat and thermally decomposable metal bearing compounds in its passage.

Sliding of the material in supported relation with the heater operating under controlled conditions permits most heat softenable or heat-sensitive materials to be raised to the decomposition point of a metal bearing gas without distortion of the material; passing the material into the atmosphere of the plating gas continuously and while unsupported other than by tension in the material permits each of the individual filaments to be exposed to the plating gas and to become metallized.

The speed of drawing through the heaters and plating chambers is an important factor with most heat-softenable materials. With the apparatus of invention speeds of from a few feet per minute to a thousand or more feet per minute are attainable; at low speeds the material is of course raised quickly in temperature by the heaters and such speeds are useful for materials having high softening points—since the plating chambers in this invention do not themselves have a source of heat it is frequently desirable to raise the temperature as high as possible—that is the maximum temperature which the material will withstand in order to permit employment of gaseous compounds which decompose at high temperatures.

The material as it passes from its supported position in the heater to the unsupported position in the plating chamber normally tends to vibrate and to expose individual filaments to the plating gas—however as the speed decreases this tendency to separation is lessened and at low speeds and with heavy materials it is usually desirable to introduce a synthetic vibration if individual filaments are to be completely metallized. Normally at speeds below 100 feet per minute with most filamentary materials a synthetic vibration is induced as noted more particularly hereinafter.

Materials which may be metallized suitably in the apparatus of invention include glass fibers, particularly in roving form as already described, dynel, cotton, nylon, Orlon, Saran, Vinyon, acrilan and the like. Glass fiber rovings however are in general somewhat more difficult to handle than the twisted yarns in which the other materials are normally commercially provided and accordingly the invention will be particularly described with reference thereto.

As plating gases the carbonyls of nickel, iron and chromium are generally preferred as the compounds are commercially available, satisfactory with respect to cost and provide excellent bonds with substantially all heat-softenable materials, and the apparatus of invention is readily adaptable to accommodate the same, even in the case of solid compounds, although the invention will be particularly described with respect to nickel carbonyl which is a liquid at normal temperatures and pressures.

Other plating materials useful in the plating or metallization of the materials described include copper acetyl acetonate; the nitrosyls; nitrosyl carbonyls, for example, cobalt nitrosyl carbonyl; hydrides, such as antimony hydride, tin hydride; metal alkyls; chromyl chloride; and carbonyl halogens, for example, osmium carbonyl bromide, ruthenium carbonyl chloride, and the like.

Provision is made in the apparatus of invention for the drawing of the filaments through the plating train, the voltalization of the materials which form the plating gases, the sealing of the heaters from the plating or metallization chambers, the maintenance of the heaters and metallization chambers at substantially constant outside temperature, the recovery of undecomposed metal bearing gases which recovery renders the process commercially feasible, inspection electrically of the materials as they are plated, and control apparatus for the various functions.

The invention will be more fully understood by reference to the following detailed description and accompanying drawings wherein:

Figure 2 is a front elevational schematic view and partially in section illustrating the major components for the effecting of the deposition of metal on materials passing through the equipment;

Figure 3 is a fragmentary view of the right hand end of the equipment illustrated in Figure 1 and shows vibratory apparatus useful in conjunction with the plating operation;

Figure 4 is a plan view of the structure of Figure 3;

Figures 5 and 6 are schematic views illustrating winding apparatus useful in reeling yarns which have been metallized in the equipment of Figure 1;

Figure 7 is a perspective view illustrating the arrangement of the structures of Figures 5 and 6;

Figure 8 is a front elevational view illustrating a supply mechanism for yarn to be fed to the metallizing equipment;

Figure 9 is a front elevational view of a control board useful in regulating the apparatus of invention;

Figure 10 is a sectional view illustrating novel heating means of the equipment;

Figure 11 is a perspective view illustrating the arrangement of parts in the novel heating equipment of invention;

Figure 12 is a sectional view taken on line 12—12 of Figure 10;

Figure 13 is a sectional view taken on line 13—13 of Figure 11;

Figure 14 is a perspective view of the novel gas plating chamber of invention;

Figure 15 is a view taken on line 15—15 of Figure 14;

Figure 16 is a view partially in section taken on line 16—16 of Figure 15 illustrating the novel combination of gas plating chamber and heating equipment of invention;

Figure 17 is a perspective view illustrating an arrangement for inductively heating partially metallized materials in accordance with the precepts of the invention;

Figure 18 is a view taken substantially on line 18—18 of Figure 17 but with the left hand portion thereof enlarged for the sake of clarity;

Figure 19 is a sectional view taken on line 19—19 of Figure 18;

Figure 20 is a sectional view taken on line 20—20 of Figure 18;

Figure 21 is an elevational view illustrating a supply tank for liquid gas plating material and the connections therefor;

Figure 22 is a sectional view taken on line 22—22 of Figure 21;

Figure 23 is a sectional view taken on line 23—23 of Figure 22;

Figure 24 is an elevational view of a vaporizer;

Figure 25 is a sectional view taken on line 25—25 of Figure 24;

Figure 26 is a sectional view taken on line 26—26 of Figure 25;

Figure 27 is a sectional view taken on line 27—27 of Figure 25;

Figure 28 is a perspective view partially blown away illustrating condenser apparatus of the invention;

Figure 29 is an elevational view partially in section illustrating the condenser apparatus of Figure 28;

Figure 30 is a sectional view taken on line 30—30 of Figure 29;

Figure 31 is a circuit diagram illustrating electrical connections of the apparatus of invention for 220 volt power supply; and Figure 32 is a view similar to that of Figure 31 for 110 volt power supply.

Figure 1:
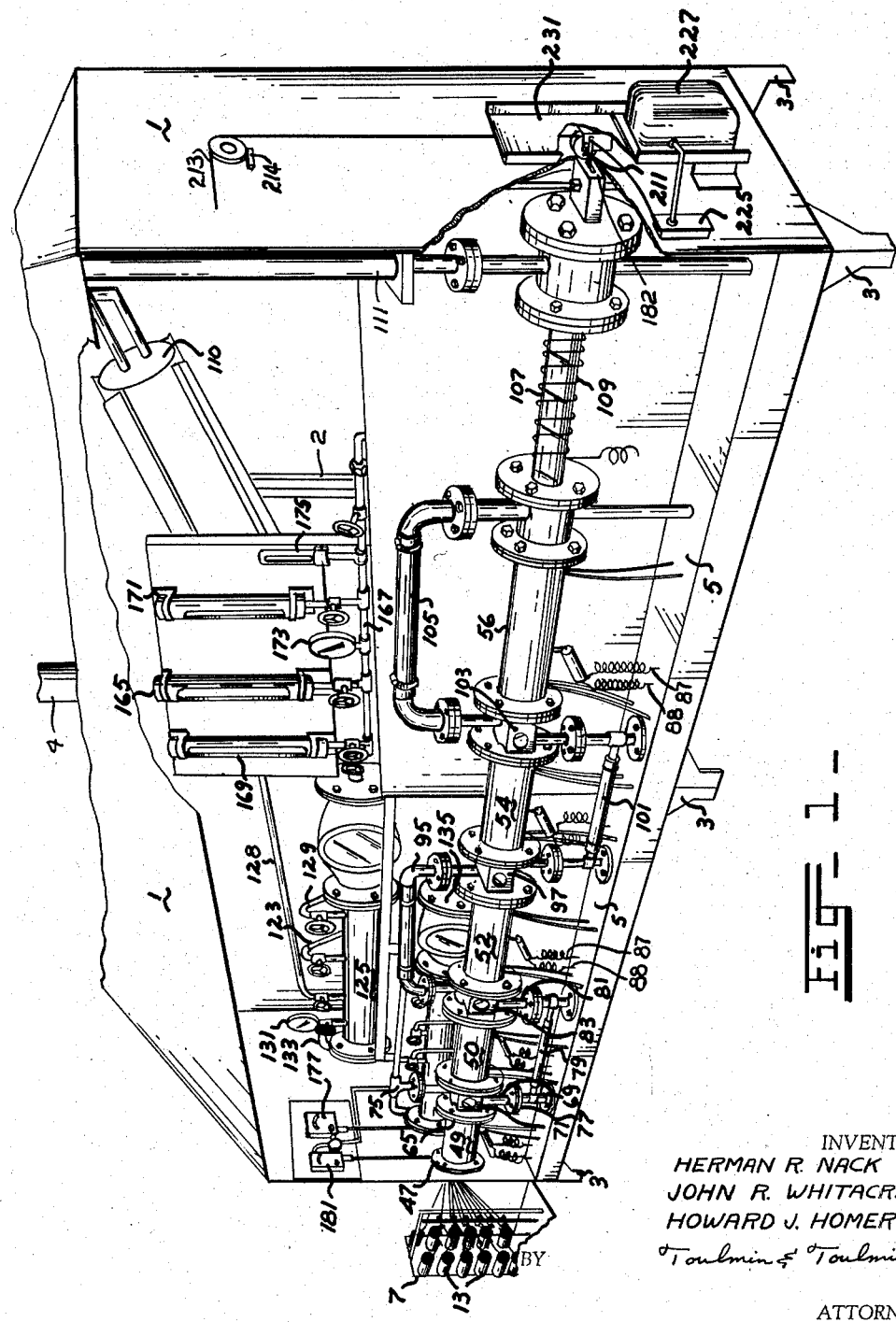
Figure 1 is a perspective view illustrating the general arrangement of the principal components of the apparatus of invention, the hood being shown broken away and partly in section.

Referring to the drawings and particularly initially to Figures 1–4, inclusive, and 8, there is provided at 1 a longitudinally extending hood having supports 3, a stack 4, and a forward flange 5 upon which the principal components of the gas plating equipment are supported. Essentially these components are the metallizing train constituted of the heaters, plating chambers and conduits for plating gas flow.

Leftwardly in Figure 1, and as more clearly shown in Figure 8, there is provided a stand 7 having a base 9 on which there are supported a plurality of shafts 11 for the support of bobbins 13 of glass fiber rovings. Each of these bobbins comprises glass fiber material having 8 ends, each of which ends has about 204 filaments, and accordingly the strand 15 issuing from each bobbin has approximately 1632 separate filaments.

A tubular member 17 secured between the stand 7 and a forward tubular member 19 supports vertically extending members 21, 23, each of which are secured at their upper end to a cross bar 25 in the form of a tubular member. The member 21 is provided with a plurality of eyelets 27 one for each of the strands 15 and the member 23 is provided with supports 29 for split pulleys 31. The strands 15 pass through the eyelets over the split pulleys singly and are merged into four groups of three strands at the heddle 33. The numeral 35 designates the pulley over which the strands pass into the plating equipment. It is to be noted that in the apparatus shown (Figure 1) 12 bobbins are being fed into the equipment simultaneously and that the four groups of 3 strands each pass through the metallizing equipment together.

Referring now to the right hand portion of Figure 8 the angle iron 37 suitably bolted to a bracket 39 mounted from the hood of the machine supports the pulley arrangement 35; rightwardly bracket 39 has secured thereto a conduit 41 through which metered carbon dioxide gas is fed from conduit 43 (Figure 2) and this carbon dioxide gas under pressure flows leftwardly as indicated by the arrow in Figure 8 through the flange and effectively seals the interior of the apparatus from the atmosphere and the entrance of air to the plating train; the numeral 44 designates a conduit which is connected to a suitable pressure gauge for visually indicating pressure within the seal which is normally at a few pounds above atmospheric. The right hand end of the conduit 41 is supported by a flange 45 which itself is bolted to the hood of the machine in opposed relation with the flange 47 which is secured interiorly of the hood (Figure 1).

Referring now particularly to Figures 1 and 2, a series of heaters are shown at 49, 50, 52, 54 and 56 and between the heaters are metallizing or plating chambers 71, 83, 97, 103. The numeral 49 indicates a first heater of the train into which the strands pass from the heddle. The construction of this and the other heaters may be clearly understood by reference first to Figures 10 through 13 wherein there is shown in detail heater 50 having a lower body 51 of brass and an upper brass body 53 positioned thereon. The lower body is slotted as at 55 longitudinally of the heater (Figure 10).

Referring now to Figure 10 it will be noted that the brass bars or bodies 51, 53 have supported thereagainst on top and bottom thereof Chromolox strip heaters 57 illustrated as resistance wires in Figure 10. These Chromolox heaters together with the bodies 51, 53 are heavily surrounded by heat insulation 59 such as transite, and the bodies and transite are suitably bolted together. The bodies 51, 53 terminate in and are secured to flanges 61, each of which is in turn (Figure 10) suitably bolted to an adjacent flange 63, the flanges bounding the heaters, except for the first which is secured to the hood, are identical throughout the train, as is the insulation material 59, and accordingly similar numerals are employed for these elements throughout.

Referring again to Figure 13 the strands of glass rovings pass into the narrow slots 55 of the heaters traversing the same and are subjected to heat derived from the brass bodies 51, 53 supplied through the Chromolox heaters 57. The length of the heater slot and the operating temperature of the Chromolox heater are dependent within limits upon the nature of the material to be metallized and the plating gas to be employed in the metallizing of the strands. For present purposes the plating gas may be considered to be nickel carbonyl and accordingly the temperature of the strands should be raised to at least about 180° C. before exiting through the rightward flanges of the heater 49; a temperature range of 375–450° F. is very suitable for nickel carbonyl and is well below the softening point of substantially all glasses.

The rightward flange of the heater 49 is designated in Figure 1 by the numeral 65 and the flange secured thereto is designated by the numeral 67, this latter flange being connected to the equipment bounding the gas plating chamber 71.

Referring to Figure 11 the flange 67 bounds an inlet conduit 75 provided for the passage of gases to a chamber 71 and itself is provided with a sight glass 73; an outlet conduit 69 extends from the chamber 71 for the exhaust of undecomposed and decomposed plating gases from the chamber. Accordingly, plating gas flows through inlet 75 across the open chamber 71 and out the conduit 69, and in its passage contacts in the plating chamber the heated strands passing therethrough which causes thermal decomposition of some of the gas and a metallic deposit on the glass filaments.

Pressure gauges indicated generally at 72 are provided to measure the pressure within the plating chamber and seals for the heaters.

The strands passing at about 300 feet per minute from the slot at 55, where they are supported in sliding contact, into the plating chamber separate into filaments and accordingly individual filaments are exposed to the plating gas. At higher rates of strand traverse (above about 100 feet per minute) the vibration induced is sufficient to substantially completely expose each of the individual glass filaments to the gaseous metal bearing compounds. At lower rates of speed it may be necessary to induce a synthetic vibration into the strands and equipment is provided for this purpose as noted more particularly hereinafter.

Referring again to Figure 1 the outlet conduit 69 is closed at the lowermost end thereof and provided with a flange 77 which is securely bolted to the hood of the apparatus and functions as a support of the plating train; similar support is provided at each of the plating chambers (Figure 1).

A conduit 79 (Figure 1) extends rightwardly from the outlet conduit 69 and communicates with the inlet conduit 81 of a second plating chamber 83. Between the plating chambers 71, 83 there is positioned heater 50 which is itself shown in detail in Figures 10–13, inclusive, as already noted.

With respect to the heaters and the metal bodies thereof which define the slots 55 of the heaters it will be noted from Figures 10 and 11 that the upper body 53 is cut through as at 85 adjacent each end and that this upper portion may be readily removed from the lower body for cleaning of the slot 55 and for assistance in initially threading the train if so desired. Also as shown in Figures 10 and 11 the heating unit 57 is provided with thermocouple leads 87, 88 for effecting measurement of the heater temperature and each heater (Figure 1) is similarly provided. Further at the left hand end of the heating unit there is provided an inlet 89 for the passage of $CO_2$ into the slot to seal the interior of the heating unit from the gas in the plating chamber 71. This $CO_2$ is under pressure and flows leftwardly of the heating unit into the plating chamber preventing the ingress of plating gas to the heaters; further $CO_2$ does flow rightwardly through the heating chamber itself to some extent and aids sealing of the right hand end of the heater from the next plating chamber; however, it is to be noted that quite unexpectedly there is little tendency for the plating gas to flow leftwardly (Figure 10) into the right hand end of the heater.

The left hand ends of the plating chambers as shown in Figures 10 and 11 are water cooled and for this purpose a conduit 90 for the in-flow of water is provided and a conduit 92 is shown connected to the upper body member; the water flows transversely of the heating units as is more clearly shown in Figure 12, the conduits 92 and 90 being interconnected at 91; the conduits are supplied from headers clearly indicated in Figure 2.

Also at the right hand end of the heating unit shown in Figures 10 and 11 cooling means are provided which include an inlet conduit 93 and an outlet conduit 94, and these conduits are interconnected in the same manner as is indicated in Figure 12. Accordingly cooling of both ends of the plating chamber is readily effected, thus inhibiting any tendency of the nickel carbonyl to deposit at the ends of the plating chamber and preventing closing thereof.

Referring again to Figure 1 the plating gas passes through the first plating chamber 71 and through the conduits, and the gases of decomposition as well as undecomposed metal bearing gases pass through the conduit 79 to the chamber 83, which is shown more clearly in Figures 14–16, inclusive, and is supported as indicated at 80 (Figure 14) on flange 5.

The arrangement for the heating and sealing of heating unit 52 is similar to that described with respect to the heating unit 50 and corresponding parts are similarly numbered but primed in Figures 14–16, inclusive. Heater 52 comprises an upper brass body 53′, a lower brass body 51′, a slot 55′, and heater elements 57′, shown most particularly in Figure 16, wherein for the sake of clarity the insulating material is deleted from the drawing; the insulating material employed however being similar to that shown in Figure 11 at 59. Each of the heaters, as is indicated in Figure 16 for heater 52, is provided as at 56, 58 with electrical leads for connection to a source of power for effecting heating.

The gases, both of decomposed and undecomposed metal bearing compounds, pass outwardly of the chamber 83 through the conduit 95 into the plating chamber 97 which is forwardly of another heating unit 52, similar to those already described.

Conduit 101 is provided to conduct gases to the plating chamber 103 and conduit 105 conveys the gases to the inlet of a plating chamber 107 comprised of a Pyrex glass tube and shown more clearly in Figures 17–20, inclusive. An induction heating coil 109 surrounds the Pyrex glass and the material which has been partially metallized in its traverse through the combination of the plating chambers 71, 83, 97, 103 and the heaters 49, 50, 52, 54 and 56 is further coated with metal in the tube or plating chamber 107.

The tube 107 is flanged at 108 and imbedded in insulating material 106 to protect the glass from undue heat of the flange 112, the flange itself having the usual narrow slot for the passage of the material. Similarly, flange 114 is provided with a slot and a flange 116 for the securing of insulating material 118 about the right hand flanged end of the tube 107.

It is to be noted that the induction heater is effective to heat the metal on the fiber as the glass fiber itself is not responsive to induction heating effects.

The gases of decomposition, including some undecomposed plating gases, are then passed through a condenser 110, supported at 2 and shown more clearly in Figures 28–30, inclusive. This condenser comprises an inlet conduit 111 communicating with the glass plating chamber 107, an outlet 112, and is surrounded by insulating material 113 in a central core of which tubes 115 pass longitudinally. Baffles 117 are provided to prevent short circuiting of the gases and the condenser is effective to condense out from the gases undecomposed carbonyl plating material. Gases of decomposition and $CO_2$ which are not condensable readily pass out through conduit 112 to the stack. The condenser tubes 115 are provided with an inlet 119 and an outlet 121 for an alcohol or other coolant medium. Outlet 112 conducts uncondensed volatiles to the stack 4 of hood 1.

Referring now to Figure 2, the liquid carbonyl flows through conduit 123 from the condenser to a storage chamber 125 (Figures 21–23, inclusive) which storage chamber has a sight gauge 124 and a normally closed hand valve 126. The chamber 125 is also supplied with fresh liquid carbonyl from a suitable cylinder 127. A valved vent line 129 to the condenser is also provided and each of the conduits 123, 129 and the line to supply 127 are suitably provided with valves for the control of carbonyl liquid. A pressure gauge 131 is suitably connected to the chamber 125 and an equalizer line 133 is connected with the pressure gauge from the vaporizer tank 135 (Figures 24–27, inclusive). The line 133 is suitably valved to close off the vaporizer from the storage tank to permit maintenance operations on the equipment. A valved by-pass line 134 for liquid level control is described hereinafter.

The vaporizer tank 135 is itself provided with a valved conduit 137 for the selective in-flow thereto of liquid carbonyl from the storage tank 125. It is also provided with a second conduit 139 having a solenoid control valve 141 for regulating the carbonyl flow to the vaporizer 135 in response to a liquid level controller described hereinafter; valve 141 may be rendered inoperable to govern flow by closing hand valve 142 if so desired.

Thermostatic controls connected as described hereinafter and the leads of which are indicated at 143 regulate the temperature in the vaporizer tank and a vent line 145 extends upwardly and outwardly of the operating equipment through normally closed hand valve 144 for exhausting to the stack when such may be required.

As more clearly seen in Figure 26 the vaporizer is provided with a water jacket 147 (Figure 25) and a conduit 149 (Figure 24) is provided for the inlet of water to the same, while conduit 151 is provided as an outlet. The vaporizer is also flanged at 160 and provided with a sight glass 157 having a sight gauge 159. Rightwardly the vaporizer is provided with a conduit 161 which is interconnected at valve 166 with conduit 163, the latter being operably associated with flow meter 165, through which carbon dioxide flows from header 167 to the vaporizer 135.

Header 167 (Figure 2) is provided for the flow meter 165 and also for flow meters 169, 171 and 175, the header having a pressure gauge 173 also. The header 167 is connected to a carbon dioxide source (not shown).

A Bristol liquid level controller 177 is provided and the diaphragm portion thereof indicated at 180 is connected through a valve 179 to the vaporizer 135. The vapor pressure from the vaporizer acts upon one side of the diaphragm in a known manner and actuates the controller 177. The solenoid valve 141, as already noted, provides for flow of liquid carbonyl from the storage chamber 125 in response to actuation of the controller when the liquid level in the vaporizer is low.

In addition a hand valve, as may be noted in Figure 2, is provided at 142 for shutting off the solenoid, and an additional hand valve is provided for manually controlling the liquid carbonyl feed when such operation is desired. The valved by-pass line 134 is also connected to the Bristol controller at 180 on the controller side of the diaphragm for balancing of pressures.

As most clearly shown in Figure 2 the electrical leads indicated at 185, 187 are connected with both the liquid level control and the air temperature indicator 181 and also to the solenoid 141 at the output of supply tank 125. Thermostat 186 in the air bath 188 is operably connected to indicator 181 for visually showing the air bath temperature which may normally be about 110° F. to 120° F.

Pump 189 driven by motor 190 (Figure 2) and connected to a water storage tank 191 by suitable conduits has a pressure gauge 193 and the arrangement is utilized to supply water to the vaporizer 135. A heater 195 is provided in conduit 196, and suitable pressure gauges 197, 199, and a solenoid control valve indicated at 201 are provided for control of the flow of water to the vaporizer. Hand valve 204 is generally open and useful for manual control when so desired. A return line 202 exhausts water back to the tank 191. Valved lines 198 and 200 having hand valve 196 provide manual control of the flow when so desired and permit of flowing cold water to the vaporizer to reduce the temperature thereof quickly.

Motor 203 through suitable driving gear such as a belt and pulleys 205 actuates a blower 207 which is provided with a heater 209 and hot air is supplied to the jacket 188 by means thereof.

It is most important that adequate sealing be provided at the inlet of heater 49 and at the outlet of plating chamber 107 as these sealings govern the overall sealing of the plating train. Conduit 43 (Figure 2) is supplied with an inert sealing gas, carbon dioxide through flow meter 169 from header 167 to seal the inlet. The outlet is similarly gas sealed with carbon dioxide by flow from header 167 through flow meter 171 to conduit 178 which is in communication with the outlet of the train at 182 (Figure 1).

Conduit 176 (Figure 2) extends from flow meter 175, itself connected with carbon dioxide header 167, to the header 178 which provides $CO_2$ to the seals at each of inlets of heaters 50, 52, 54 and 56.

Referring again to Figure 1 and also to Figures 3 and 4 the metallized yarn passes outwardly of hood 1 and over a pulley 211 and thence over pulley 213 supported in insulated relation with hood 1 to insulatively mounted pulleys designated generally at 215 (Figure 5) where the three separate groups of strands are indicated at 217, 219, 221. Electrodes 214, 216 are provided for measuring the electrical resistance of the individual groups of strands; separation into individual groups may be effected prior to or after the pulley means 215; as indicated each of the separate electrodes 216 and electrode 214 form through a single group (Figure 9) a complete circuit with a meter and resistance is readily measurable. Separation before electrode 214 requires 3 electrodes 214 and 3 pulleys at 213.

Positioned at the outlet of the hood 1 is a vibrator apparatus indicated generally at 223 (Figure 3) which comprises an inlet box 225 for the supplying of current to the coil of a solenoid contained in the box 227, which may be any usual type of solenoid arrangement.

The box 227 is supported on a rigid plate 229 and a vibrator plate 231 is supported by plate 229. This vibrator plate carries frame 233 which supports the pulley 211 and accordingly actuation of the solenoid control causes vibration of the pulley 211, which vibrations are transmitted to the yarns passing over the pulley and the strands passing through the whole apparatus, and as indicated in Figure 1 are caused to separate into their individual filaments to an extent sufficient such that each individual filament is subjected to the vapors of the metal bearing gas in the chambers and accordingly each of the filaments are individually coated with metal.

It has been noted hereinbefore that the slots are relatively narrow which is definitely preferred in order that the fibers passing therethrough will be readily heated. Nevertheless, the vibration set up at the pulley 211 is sufficient, even at very low speeds, to prevent cross bridging of the metal depositing on the individual filaments. The strands passing over pulley 213 are substantially free of vibration as they enter the driving rolls of the furnishing machine now to be described.

The furnishing machine as illustrated in Figures 5 and 7 provides two substantially independent operations, one of which is to draw the yarn strands through the equipment and the other of which is to furnish the yarn to a winding traverse. Inasmuch as the operation of each of the separate units is identical only one arrangement will be described, that in connection with strand group 217, which strand group comprises four separate strands. Corresponding parts in the remainder of the furnishing machine for the drawing of strand groups 219 and 221 will be indicated by the same numeral.

Thus the strand 217 passes downwardly over a guide pulley 235 and thence to the driving roll 239 and passes between the driving roll and a spring mounted pressure roll 237 which maintains driving friction against the strands, the strand group passing between these rolls and over the lower guide pulley 241 (Figure 5). From the pulley 241 the strand passes upwardly over a camming device housing a counterweight 243 and onto the reel 245.

A motor as shown more clearly in Figure 6 indicated at 247 is operably connected through belting indicated generally at 249 for actuation of the driving rolls 239. A magnetic clutch which is housed at 250 slips sufficiently to provide uniform tension on the strand groups at all speeds of drawing, and a second motor 251 is provided for actuation of the reels. Suitable belt idlers 253 are provided as indicated most particularly in Figure 6.

This whole furnishing machine and reeling unit are supported on a stand as indicated at 255. The furnishing machine is itself known and details thereof form no part of the present invention.

Referring now to Figure 9 there is indicated a panel control board for regulating the operating variables. Most particularly as indicated from A to E therebelow there are switches for actuating the fiber heaters, the temperature indicators for the heaters being thereabove; these heaters are each operably associated with a thermocouple buried in the insulation of an individual heater as at 87, 88 in Figure 10. Centrally of the board there is provided rightwardly at 257 a vaporizer temperature indicator and is operably associated with the leads at 143 in Figure 2; the numeral 259 indicates a temperature indicator for the coolant at the inlet of the condenser 110 while the numeral 261 indicates the temperature of the coolant at the outlet. The numeral 263 designates the temperature of the outlet of the condenser 110 to stack 4; numeral 265 indicates the temperature of the coolant storage (not shown); numeral 267 indicates heater flange temperature of the first heater 49; the numerals 269, 271 and 273 designate ohmmeters which are operably associated with the pulleys at 213 and the pulleys at 215 for measuring electrical resistance of the metallized product, that is each ohmmeter indicates the resistance of a group of three strands of glass fibers.

The numeral 275 designates an inlet pressure gauge and 277 an outlet pressure gauge for the plating train; numeral 279 indicates a gauge which measures room pressure and gauge 281 indicates the pressure in the air bath 188. The #1 plating chamber pressure is measured at 283 and the #6 outlet plating chamber pressure at 285, while the indicator at 287 designates the pressure difference between the sealing gas and the atmosphere. The numeral 291 designates generally switches for connecting the instruments operably to the coolant pump at 189, the liquid level controller 177 and the vaporizer thermostat at 143. The numeral 291 designates the control for the vibration instrument at 227.

Power to the apparatus of invention is supplied from 110 v. and 220 v. 60 cycle sources and circuit arrangements are most clearly shown in Figures 31 and 32. Referring first to Figure 31 wherein the apparatus associated with the 220 volt power is indicated, it will be noted that the heating units for the air bath are indicated generally at 298 and are supplied with current through fuse switches indicated generally at 299 and overload relays being indicated at 300. Also energized when the main line switches 301 are thrown is the hot water heater 195' (see also Figure 2); the 110 volt line from the hot water thermostat being indicated at 302 and the coil itself being indicated at 303. The winding machine motor is indicated at 251' and the starter therefor at 305, an overload relay 307 being positioned between the elements. The heater for the inert gas, that is the carbon dioxide in the present instance, is shown at 309 and a switch therefor at 311.

Also energized when the switch 301 is in operative position is a hood exhaust blower motor 313, the starter for which is indicated at 315, the hot air heater fan motor 203' is controlled by magnetic starter 317 and a maintenance start-stop switch 319. A motor 321 for an emergency exhaust blower has a stop-start switch indicated at 323 and a magnetic starter 325; a 600 amp. fuse switch is indicated at 327 on the 220 volt 3 phase 60 cycle power line.

Referring now to Figure 32 a 110 volt 60 cycle power line at 329 is provided with a switch 331 and heaters 49', 50', 52', 54' and 56' are energized from this 110 volt 60 cycle source through fuse switches indicated at 333, 335, 337, 339 and 341, and the connections for the Bristol controls for the heaters are indicated generally at 343, 345, 347, 349 and 351.

A motor 190' for the hot water pump is connected in parallel with the hot water thermostat 143' and the hot water relay coil 353, a fused manual start switch for the apparatus being indicated at 355. Means for maintaining the coolant of the condenser at low temperature are indicated at 357 and an overload relay 359 and manual start switch 361 are shown in association therewitth.

A spot light 363 actuated by a manual switch 365 and a fused switch 367 are shown to be in parallel with the furnishing motor 247' which itself is provided with a manual start switch 369; an air bath heater relay is shown at 371 and a switch 373 for the meter 181 and a fused overload switch 375 is shown in parallel therewith, the circuit through the air bath relay being normally open, as indicated at N.O. in Figure 32.

The motor for the coolant pump is indicated at 377 and the circuit is likewise provided with a fused overload switch 379. The fiber vibrator is indicated schematically at 227' and a rectifier 381 for deriving pulsating D.C. voltage from the A.C. power line is provided in conjunction with a fused overload switch 383.

The liquid level solenoid is indicated at 385, the liquid level meter being schematically illustrated at 177' and the circuit being provided with a fused overload switch 387. The solenoid for the vaporizer is indicated at 389 and the solenoid for the liquid level indicator is shown at 181', and the solenoid and indicator being energized through a fused overload relay 391.

Referring now to the process of invention and to specific operating conditions and the results attained thereby—it is to be noted that the plating train is first threaded by removing the transite slabs which are held against the brass heater plates in any suitable manner as springs surrounding the slabs, opening the heaters and passing the ends through from the reels to the winding machine. The plating train is then flushed free of air with $CO_2$ by maintaining valves 166 open and valves 162 and 164 closed; at this time the air bath is preferably up to temperature and all other components are ready for operation.

The following specific examples indicate the influence of the various factors on the plating deposit, the electrical resistance measurement being obtained by imposing a voltage across a group of three strands between pulleys 213, 215 as the strands were drawn; the values given in the data however are for individual filaments which were spot checked quite thoroughly individually, the resistances of individual filaments being remarkably uniform at any given operating condition.

Example I

Five runs were made and the following conditions prevailed in each run:

| | |
|---|---|
| Fiber heater temperature _____ °F__ | 650 |
| Vaporizer temperature _____ °F__ | 90 |
| Condenser coolant inlet temperature _____ °F__ | 21 |

Flow of carrier gas ($CO_2$) in cubic feet per minute—standard conditions of temperature and pressure:

| | |
|---|---|
| (a) Inlet seal | .18 |
| (b) Outlet seal | .43 |
| (c) Flange seals | .11 |

System pressure in inches of water relative to the stack pressure:

| | |
|---|---|
| (a) Inlet seal | .8 |
| (b) Outlet seal | .85 |
| (c) Air bath | .72 |
| (d) Plating chamber | .60 |
| (e) Heater | .10 |
| (f) System outlet | .55 |
| Vaporizer water temperature _____ °F__ | 140 |
| Metal bearing compound _____ | Nickel carbonyl |

With the above conditions prevailing and at a speed of 100 feet per minute of the rovings through the equipment the carbon dioxide flow over the carbonyl in the vaporizer was varied in the tests as indicated below and the resistance in ohms per inch of the length of the individual filaments was found; thus

| Carrier gas flow in c.f.m. at standard conditions: | Resistance of filaments, ohms per inch |
|---|---|
| 0.1 | 98,000 |
| 0.3 | 65,000 |
| 0.5 | 26,000 |
| 0.7 | 6,500 |
| 1.0 | 6,500 |

Thus the rate of passage of the carrier gas, which as it becomes greater increases the vapor pressure of the carbonyl in the plating gas, has a decided bearing on the conductivity of the filaments.

In each of the examples the inlet and outlet seal pressures are the pressures at heater 50 while the system outlet pressure is the pressure at 182 (Figure 1).

It is to be noted that vacuum producing means to attain pressures as low as .1 mm. of mercury may be provided but operation at pressures approaching that of the atmosphere are preferred as such provides for both effective sealing and greater deposits of metal in a given time.

Example II

Three runs were made and the following conditions prevailed in each run:

| | |
|---|---|
| Fiber heater temperature _____ °F__ | 850 |
| Vaporizer temperature _____ °F__ | 99 |
| Condenser coolant inlet temperature_____ | Zero |

Flow of carrier gas ($CO_2$) in cubic feet per minute—standard conditions of temperature and pressure:

| | |
|---|---|
| (a) Inlet seal | .26 |
| (b) Outlet seal | .47 |
| (c) Flange seals | .17 |
| (d) Carrier gas | .2 |

System pressure in inches of water—relative to the stack pressure:

| | |
|---|---|
| (a) Inlet seal | .95 |
| (b) Outlet seal | .85 |
| (c) Air bath | .72 |
| (d) Plating chamber | .72 |
| (e) Heater | .10 |
| (f) System outlet | .66 |
| Vaporizer water temperature _____ °F__ | 140 |
| Metal bearing compound _____ | Nickel carbonyl |

With the above conditions prevailing the fiber speed was changed as indicated below, and the resistance of the filaments measured in the manner set out hereinbefore:

| Fiber speed in feet per minute | |
|---|---|
| 100 | 2300 |
| 60 | 780 |
| 25 | 420 |

It will be noted that in the second example maintenance of constant conditions except for the fiber speed resulted in a materially improved conductivity at the lower fiber speed. It is also to be noted by comparison of Examples I and II that increasing the fiber heater temperature and the vaporizer temperature also materially contributed to the improved conductivity. For example, at a carrier gas flow of 0.3 of a cubic foot per minute in Example I, and a fiber speed of 100 feet per minute, a resistance of 65,000 ohms per inch was obtained, while in Example II, wherein practically all of the conditions had similar values, except that the carrier gas flow had a slightly lower rate than 0.2 foot per minute; the temperature increase of the fiber heater and the vaporizer temperature at a speed of 100 feet per minute reduced the resistance to 2300 ohms per inch—a very large change when one considers the small change in vaporizer temperature. However at 99° F. carbonyl is rapidly approaching its boiling point.

Example III

Five runs were made and the following conditions prevailed in each run:

| | |
|---|---|
| Fiber heater temperature _____ °F__ | 650 |
| Vaporizer temperature _____ | Variable |
| Condenser coolant inlet temperature_____ | Zero |

Flow of carrier gas ($CO_2$) in cubic feet per minute—standard conditions of temperature and pressure:

| | |
|---|---|
| (a) Inlet seal | .14 |
| (b) Outlet seal | .42 |
| (c) Flange seals | .17 |
| (d) Carrier gas | .2 |

System pressure in inches of water—relative to the stack pressure:

| | |
|---|---|
| (a) Inlet seal | .35 |
| (b) Outlet seal | .45 |
| (c) Air bath | .35 |
| (d) Plating chamber | .09 |
| (e) Heater | .08 |
| (f) System outlet | .06 |
| Vaporizer water temperature _____ °F__ | 120 |
| Metal bearing compound_____ | Nickel carbonyl |

With the above conditions prevailing and a fiber speed of 100 feet per minute, the vaporizer temperature was varied as indicated below and the resistance obtained as shown:

| Vaporizer temperature in degrees Fahrenheit: | Resistance of filaments in ohms per inch |
|---|---|
| 93 | 172,000 |
| 95 | 69,000 |
| 98 | 17,000 |
| 100 | 8,500 |
| 101 (substantially boiling point) | 3,200 |

Thus it will be noted that the vaporizer temperature has a material effect upon the amount of metal deposited, the amount deposited increasing rapidly as the temperature approaches the boiling point and the partial pressure of the carbonyl in the plating chamber becomes high,

Example IV

Three runs were made and the following conditions prevailed in each run:

| | |
|---|---|
| Fiber heater temperature | Variable in this instance |
| Vaporizer temperature | °F 100 |
| Condenser coolant inlet temperature | °F 2 |

Flow of carrier gas ($CO_2$) in cubic feet per minute—standard conditions of temperature and pressure:

| | |
|---|---|
| (a) Inlet seal | .2 |
| (b) Outlet seal | .4 |
| (c) Flange seals | .17 |
| (d) Carrier gas | .1 |

System pressure in inches of water—relative to the stack pressure:

| | |
|---|---|
| (a) Inlet seal | .82 |
| (b) Outlet seal | .85 |
| (c) Air bath | .75 |
| (d) Plating chamber | .62 |
| (e) Heater | .10 |
| (f) System outlet | .95 |
| Vaporizer water temperature | °F 120 |
| Metal bearing compound | Nickel carbonyl |

With the above conditions prevailing and a fiber speed of 100 feet per minute, the fiber heater temperature was variable as indicated and the resistance results enumerated obtained:

°F.:
| | |
|---|---|
| 650 | 8,600 |
| 700 | 4,900 |
| 750 | 2,600 |
| 800 | 1,900 |

It is thus to be noted that as the fiber heater temperature increases the ohmic resistance of the glass fiber roving decreases materially.

Example V

The same length in this instance was passed through the plating train three times and the following conditions prevailed in each pass:

| | |
|---|---|
| Fiber heater temperature | °F 750 |
| Vaporizer temperature | °F ¹ 102 |
| Condenser coolant inlet temperature | °F 5 |

Flow of sealing gas ($CO_2$) in cubic feet per minute—standard conditions of temperature and pressure:

| | |
|---|---|
| (a) Inlet seal | .19 |
| (b) Outlet seal | .50 |
| (c) Flange seals | .5 |

No carrier gas employed.

System pressure in inches of water—relative to stack pressure:

| | |
|---|---|
| (a) Inlet seal | .90 |
| (b) Outlet seal | .95 |
| (c) Air bath | .76 |
| (d) Plating chamber | .76 |
| (e) Heater | .11 |
| (f) System outlet | --- |
| Vaporizer water temperature | °F 150 |
| Metal bearing compound | Nickel carbonyl |

¹ Boiling.

With the above conditions prevailing and a fiber speed of 100 feet per minute the resistance was measured after each pass through the plating train and the following data found:

| | Ohms per inch |
|---|---|
| #1 pass | 2180 |
| #2 pass | 1250 |
| #3 pass | 650 |

It is to be noted that the metallized fiber glass handled well on the repasses through the equipment and that the ohmic resistance was materially reduced by repassing.

The foregoing examples all refer to glass fiber rovings. The examples noted hereinafter refer to twisted yarns, a plurality of which yarns were fed to the equipment described in the same manner as set forth in connection with the rovings.

Example VI

In this instance a Dynel yarn was metallized utilizing nickel carbonyl, and the following conditions and results were attained:

| | |
|---|---|
| Fiber temperature | °F 300 |
| System temperature | °F 100 |
| Speed—feet per minute | 50 |
| Vaporizer temperature | 105 |
| System pressure in inches of water | .72 |
| Plating chamber pressure in inches of water | .75 |
| Ohms resistance per inch | 1,500,000 |

The Dynel fibers changed upon metallization from a whitish to a dark gray.

Example VII

In this instance a nylon yarn was metallized, utilizing nickel carbonyl, and the following conditions prevailed and results attained:

| | |
|---|---|
| Fiber temperature | °F 350–400 |
| System temperature | °F 100 |
| Speed—feet per minute | 50 |
| Vaporizer temperature | 107 |
| System pressure | .71 |
| Plating chamber pressure | .74 |
| Ohms resistance per inch | 10,000 |

The nylon fibers changed from a translucent to a dark silvery coating.

Particularly, in addition to the foregoing, cotton and Eastman Chromspun yarn have been metallized, the cotton changing from white to a dark metallic sheen; the Eastman Chromspun yarn also darkened but had a much higher sheen than the cotton. The conductivity was lowered materially in each case from substantial infinity to relative good conductivity. Other metals which have been deposited by the thermal decomposition of decomposable compounds in the equipment include chromium and iron.

The results of these testings indicate that the resistance of chromium when subjected to the same metallization processes as specifically outlined hereinbefore is about one and a half times greater on the yarn than is the case with nickel. Iron is characterized by a higher conductivity than that of chromium, but still less than that of the nickel deposit, the resistance figures attained being about one and a quarter times that of nickel. Other metals which are readily deposited to attain greater or lesser conductivity include lead, copper and silver—the lead being considerably higher in resistance, that is, about two and a quarter times that of nickel; while the copper and silver are deposited to a sufficient extent, under the same conditions outlined, to give a resistance of about one-fifth that of nickel.

In substantially all instances 3,000 feet or more of rovings were passed through the apparatus in each test run and the results favor:

(1) Increasing the carrier gas flow for particular operating conditions within limits which are readily determinable;

(2) Reducing the speed for any given filamentary material to that practicable in view of the nature of the material and temperature required and altering other factors if necessary to increase the metallizing rate;

(3) Increasing the vaporizer temperature until the carbonyl or other plating gas has as high a vapor pressure as possible and in fact operating with substantially none or a minimum of carrier gas which tends to dilute the metal bearing gas;

(4) Raising the fiber heater temperatures to that maximum which the material will stand at the drawing speed without distortion;

(5) Where very high conductivity is required increasing the length of the plating train, making more passes of the material or combining the foregoing factors 1–4, incl., to produce the highest rate of metallization;

(6) Raising the speed of above about 300 feet per minute of some materials such as Dynel is satisfactory, but in general such speed should be confined to relatively light weight materials and those which do not attain a sufficient vibratory action to cause breakage of the strands in the equipment. Where high speeds are employed the forward edges of the heaters should always be rounded off in order to avoid any undue frictional effect at the entrance to the heater, and such is good practice even at lower speeds.

The metallized materials are useful for forming into cloth, for use in their filamentary form as rovings, for curtains, drapes, seat covers, for lamination with plastics, for employment in electronic circuits as elements of controlled electrical conductivity particularly at high frequencies.

It is to be most clearly noted that the metallization does not affect the flexibility of the materials to any noticeable extent and that in the case of several types of filaments such as nylon the treatment in accordance with the invention has resulted in an increase of tensile strength by 10 to 15 percent.

While the apparatus has been described particularly in connection with materials comprised of a plurality of individual filaments the same may be adapted to readily receive tapes, cloths or fabrics for metallization thereof.

In substantially all cases an electrical conductivity of the materials satisfactory for anti-static purposes may be attained in one passage of the equipment and the metallized materials are lustrous and highly suitable for decorative purposes. In fact fabrics metallized in accordance with the invention are useful as fire-resistant vapor-proof wall papers.

It will be understood that this invention is susceptible to modification in order to adopt it to different usages and conditions and accordingly, it is desired to comprehend such modifications within this invention as may fall within the scope of the appended claims.

We claim:

1. In a machine for gas plating metal onto long continuous length flexible filaments or strands of material as the same is continuously moved lengthwise and without impairing the flexibility and physical characteristics of the material, said machine comprising a train made up of elongated heaters and elongated gas plating chambers having an outlet at one end and an inlet at the opposite end through which the strand is moved, said heaters and gas plating chambers being arranged in pairs consisting of a heater and a gas plating chamber and wherein the outlet from the heater is connected to the inlet of the gas plating chamber and the outlet of the gas plating chamber is connected to the inlet to a heating chamber in the train, means comprising conduit connections from a source of inert gas under pressure and to the inlet and outlet of said gas plating chamber for fluid sealing the same against the passage of plating gas from the gas plating chamber, and means comprising conduits connected to a source of liquid coolant and to the opposite ends of said gas plating chamber for cooling both ends of said chamber, and means for moving the material to be gas plated continuously therealong through the train of heaters and gas plating chambers and to storage.

2. In a machine for gas plating metal onto long continuous length flexible filaments or strands of material without impairing the flexibility and physical characteristics of said material, said machine comprising a train of multiple heaters and gas plating chambers, each of said heaters and gas plating chambers comprising elongated chambers having an outlet at one end and an inlet at the opposite end through which the strand is moved, said heaters and gas plating chambers being arranged in pairs consisting of a heater and gas plating chamber connected together end-to-end, means comprising inert gas under pressure for sealing the inlet and outlet to each of said gas plating chambers, and liquid coolant means disposed at the end of each of the heaters and adjacent the gas plating chamber and sealing means, and means for moving said strands of material through said train.

3. In a machine for gas plating metal onto long continuous length flexible filaments or strands of material without impairing the flexibility and physical characteristics of said material, said machine comprising a train made up of elongated heaters and elongated gas plating chambers having an outlet at one end and an inlet at the opposite end through which the strand is moved, said heaters and gas plating chamber being arranged in pairs consisting of a heater and a gas plating chamber and wherein the outlet from the heater is connected to the inlet of the gas plating chamber and the outlet of the gas plating chamber is connected to the inlet to a heating chamber in the train, means comprising conduit connections from a source of inert gas under pressure and to the inlet and outlet of said gas plating chamber for fluid sealing the same against the passage of plating gas from the gas plating chamber, and means comprising conduits connected to a source of liquid coolant and to the opposite ends of said gas plating chamber for cooling both ends of said chamber, means for supporting a plurality of spools of said material to be gas plated, winding means for individually winding up and storing the metal plated filaments, and means for moving the material from said support means through said train of heating and gas plating chambers and onto said winding and storing means.

4. In a machine for gas plating metal onto long continuous length flexible filaments or strands of material without impairing the flexibility and physical characteristics of said material, said machine comprising a train of heating and gas plating chambers connected together in pairs, each of said heaters and gas plating chambers comprising elongated chambers having an outlet at one end and an inlet at the opposite end through which the strand is moved, means comprising conduit connections from a source of inert gas under pressure and to the inlet and outlet of said gas plating chamber for fluid sealing the same against the passage of plating gas from the gas plating chamber, heddle means disposed at the entrance of said train, means comprising guide sheave at the exit of the train for guiding the strands of material being gas plated, means to pass a plurality of strands to the heddle means to group the strands, means to convey the grouped strands through the heating and gas plating chamber means, and means including pulley guide means to separate the grouped strands into individual strands.

References Cited in the file of this patent

UNITED STATES PATENTS

| | | |
|---|---|---|
| 596,696 | Custer | Jan. 4, 1898 |
| 820,025 | Steinecke | May 8, 1906 |
| 1,144,595 | Henderson | June 29, 1915 |
| 1,310,037 | Snelling | July 15, 1919 |
| 1,323,883 | Lutz | Dec. 2, 1919 |
| 1,480,804 | Fish | Jan. 15, 1924 |
| 1,710,747 | Smith | Apr. 30, 1929 |
| 1,759,661 | Muller et al. | May 20, 1930 |
| 1,878,651 | Teetsow | Sept. 20, 1932 |
| 1,971,104 | Harter | Aug. 21, 1934 |
| 1,987,577 | Moers | Jan. 8, 1935 |
| 2,040,105 | Ritzert | May 12, 1936 |
| 2,080,494 | Martindell | May 18, 1937 |

(Other references on following page)

UNITED STATES PATENTS

| Number | Name | Date |
|---|---|---|
| 2,081,620 | Fether | May 25, 1937 |
| 2,241,228 | Weinhart | May 6, 1941 |
| 2,289,763 | Earp | July 14, 1942 |
| 2,290,373 | Lee | July 21, 1942 |
| 2,320,801 | Simons | June 1, 1943 |
| 2,580,976 | Toulmin | Jan. 1, 1952 |
| 2,587,036 | Germer et al. | Feb. 26, 1952 |
| 2,616,165 | Brennan | Nov. 4, 1952 |
| 2,622,041 | Godley | Dec. 16, 1952 |
| 2,656,283 | Fink et al. | Oct. 20, 1953 |
| 2,665,224 | Clough et al. | Jan. 5, 1954 |
| 2,690,980 | Lander | Oct. 5, 1954 |
| 2,694,377 | Pawlyk | Nov. 16, 1954 |
| 2,698,627 | Kearney et al. | Jan. 4, 1955 |
| 2,698,810 | Stauffer | Jan. 4, 1955 |
| 2,699,415 | Nachtman | Jan. 11, 1955 |
| 2,704,727 | Pawlyk | Mar. 22, 1955 |
| 2,749,255 | Nack et al. | June 5, 1956 |

FOREIGN PATENTS

| Number | Country | Date |
|---|---|---|
| 557,597 | Great Britain | Nov. 26, 1943 |